UNITED STATES PATENT OFFICE.

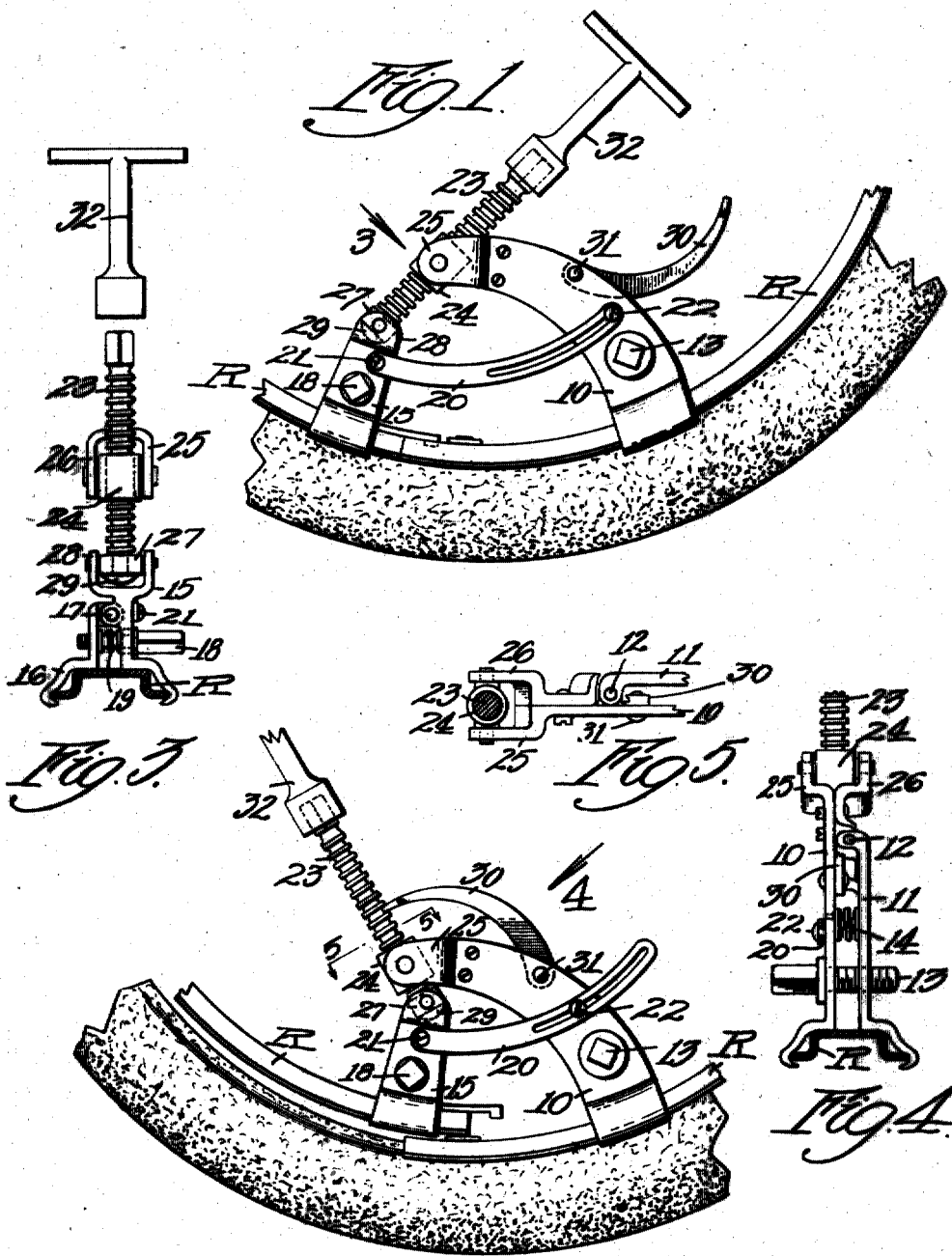

PANTALEONE A. DE COLLIBUS, OF WORCESTER, MASSACHUSETTS.

RIM-CONTRACTING DEVICE.

1,279,291.  Specification of Letters Patent.  Patented Sept. 17, 1918.

Application filed November 26, 1917. Serial No. 203,904.

*To all whom it may concern:*

Be it known that I, PANTALEONE A. DE COLLIBUS, subject of the King of Italy, residing at Worcester, in the county of Worcester and State of Massachusetts, have invented a new and useful Rim-Contracting Device, of which the following is a specification.

This invention relates to a rim contracting device designed to facilitate the removal of pneumatic tires from the so-called demountable rims now in common use.

Such rims, as frequently made, consist of a single ring of metal severed at one point in its circumference and provided with some form of connecting devices at the adjacent ends of the severed ring. These rims are of considerable weight and stiffness, particularly if intended for use with tires of large diameter. Convenient removal of the tire requires that one end of the rim be drawn inward out of alinement with the other end of the rim and that the rim be thereafter contracted to smaller diameter, operations commonly requiring a considerable expenditure of time and labor.

It is the general object of my invention to provide an improved device for quickly and conveniently contracting a demountable rim and for holding said rim in contracted condition while the tire is removed or replaced.

With this general object in view, an important feature of my invention consists in the provision of an operating screw in a rim contracting device, movable axially to disaline the severed end sections and movable angularly to further contract the rim.

Additional features of my invention relate to the provision of locking means for holding the rim in contracted condition and to the provision of a guide bar for retaining the several parts of the device in operative relation. My invention further relates to arrangements and combinations of parts to be hereinafter described and more particularly pointed out in the appended claims.

A preferred form of my invention is shown in the drawings, in which—

Figure 1 is a front elevation of my improved rim contracting device, as applied to a demountable rim of common form;

Fig. 2 is a front elevation similar to Fig. 1, but showing the parts in a different position;

Fig. 3 is a left-hand end elevation looking in the direction of the arrow 3 in Fig. 1;

Fig. 4 is a right-hand end elevation taken in the direction of the arrow 4 in Fig. 2, and Fig. 5 is a partial sectional view taken along the line 5—5 in Fig. 2.

Referring to the drawings, my improved rim contracting device comprises a clamping member or stand 10 to which an arm 11 is hinged at the point 12. The lower ends of the parts 10 and 11 are shaped to form clamping jaws adapted to engage the opposite edges of a rim R. A shoulder screw 13 passes loosely through an opening in the stand 10 and is threaded into the arm 11, said screw being effective to draw the parts 10 and 11 together to clamp the stand on the rim. A heavy coil spring 14 (Fig. 4) is secured in the stand 10 and engages the arm 11, thus normally separating the clamping jaws.

A second clamping member 15 is provided for engaging the rim on the opposite side of the joint between the rim sections. A clamping jaw 16 is pivoted at 17 to the member 15 and a shoulder screw 18 similar to the screw 13 passes through the member 15 and is threaded in the jaw 16 for drawing these parts 15 and 16 together, said parts being normally separated by a spring 19 surrounding the screw 18.

A guide bar 20 is pivotally connected to the member 15 by a screw 21, said bar being slotted at its opposite end and being connected to the stand 10 by a screw 22 passing through the slot in the bar. The guide bar serves to keep the two sets of clamping devices in operative relation while permitting relative movement thereof.

An operating screw 23 is threaded in a nut 24 (Fig. 5) pivotally mounted between arms 25 and 26 formed on or secured to the upper end of the stand 10. The lower end of the arm 26 may be extended outwardly as shown in Fig. 5 to form a stop for the swinging clamping arm 11.

The lower end of the screw 23 extends through a collar 27 (Fig. 3) pivotally mounted in arms 28 formed on the upper end of the clamping member 15. A washer 29 is riveted or otherwise secured to the lower end of the screw 23 to prevent withdrawal thereof from the collar 27. Swivel connections are thus provided between the screw 23 and the clamping members 10 and 15. A latch 30 is pivoted to the stand 10 at 31 for a purpose to be described.

Having thus described the construction of my invention the operation thereof will be clearly apparent from a comparison of Figs. 1 and 2. The two sets of clamping devices are first secured to the inside of the rim on opposite sides of the joint, the parts of each set being drawn together by the screws 13 and 18, for the operation of which a socket wrench 32 is provided. The screw 23 is then turned in a direction to draw the clamping member 15 toward the stand 10, thus lifting the left-hand section of the rim away from the right-hand section with which it is engaged. After this left-hand section of the rim has been raised sufficiently to clear the right-hand section, the screw 23 and socket wrench 32 are utilized as a lever to swing the parts to the position shown in Fig. 2, thus contracting the rim to a smaller diameter. The latch 30 is then moved to lock the parts in this contracted position while the tire is removed and replaced.

The latch is then released, permitting the screw 23 to swing to the right, and the screw is then turned to force the member 15 and the rim section to which it is secured outward to their original position.

Having thus described my invention, it will be evident that changes and modifications can be made therein by those skilled in the art without departing from the spirit and scope of my invention as set forth in the claim, and I do not wish to be otherwise limited to the details herein disclosed, but what I claim is:—

A rim contracting device comprising two rim clamps, an operating screw and a nut, means to attach said screw to one of said clamps, means to attach said nut to the other clamp, said screw being movable axially in said nut to disengage the parts of said rim and being movable angularly with said nut to additionally contract said rim, and means to hold said parts with the rim in contracted position.

In testimony whereof I hereunto affix my signature.

PANTALEONE A. DE COLLIBUS.